United States Patent Office 3,113,984
Patented Dec. 10, 1963

---

3,113,984
OXIDATIVE DEHYDROGENATION
Kenneth F. Gosselin, Media, and Harold Shalit, Drexel Hill, Pa., assignors to Air Products and Chemicals, Inc., a corporation of Delaware
No Drawing. Filed Dec. 9, 1960, Ser. No. 74,750
2 Claims. (Cl. 260—677)

This invention relates to the oxidative dehydrogenation of hydrocarbons to produce olefins having from 3 to 5 carbon atoms per molecule from a feedstock having the same number of carbon atoms per molecule.

As explained in a series of patents, including Hopkins 1,808,168, saturated hydrocarbons can be treated at an elevated temperature with a gas containing only a small amount of oxygen to bring about an oxidative dehydrogenative reaction, so that the principal hydrocarbon conversion product is a mono-olefin having the same number of carbon atoms per molecule as the feedstock. Various catalysts and processing techniques have been proposed in connection with oxidative dehydrogenative procedures. As explained in Robinson 2,692,292 cyclic hydrocarbons, such as cyclohexane, are especially suitable as feedstocks for oxidative dehydrogenative reactions conducted at a very high space velocity.

Substantially all industrial production of $C_3$–$C_5$ olefins from saturated $C_3$–$C_5$ hydrocarbons has been achieved using either a cracking method or a catalytic dehydrogenation method, each of which involves an endothermic heat of the reaction. A significant portion of the cost of olefins has been attributable to the arrangements for providing the heat required for catalytic dehydrogenation and/or cracking. The by-products from such conventional manufacture (cracking and/or dehydrogenation) of olefins, whether such by-products be hydrogen and/or hydrocarbons such as methane, generally are not obtained in a purity and/or quantity justifying the isolation and separate marketing of such by-products. Accordingly, such by-products have sometimes been burned as fuel for help to provide the endothermic heat of the reaction for the manufacture of such olefins. There has been a widespread recognition that important advantages were theoretically attainable if the oxidation reaction were conducted in the dehydrogenation zone, in which more perfect heat transfer is possible, instead of separating the dehydrogenation zone from the oxidation zone. Thermodynamic considerations favor the dehydrogenation of paraffins by reaction with oxygen within a temperature range from atmospheric temperature up to at least 1300° F. while catalytic dehydrogenation is feasible only in the range of 1000 to 1300° F. Thus, oxidative dehydrogenation is favored at lower temperatures where catalytic dehydrogenation is not. Notwithstanding the long standing demand for a superior method of oxidative dehydrogenation of hydrocarbons, the thousands of chemists concerned with the manufacture of olefins found it necessary to utilize only the standard procedures for olefin manufacture, and to consider oxidative dehydrogenation as laboratory curiosity having only scientific interests without commercial significance.

In accordance with the present invention a feedstock consisting essentially of saturated acyclic hydrocarbons having from 3 to 5 carbon atoms is oxidatively dehydrogenated. The reactant gas stream consists of a mixture of said hydrocarbon feedstock, steam, oxygen, and inert gas (i.e., nitrogen containing some other components such as carbon dioxide and argon) and the volume ratios of the stream are controlled so that the ratio of hydrocarbon to steam is within the range from about 2 to 1 to about 1 to 10, and the ratio of oxygen to all other components is within the range from 1 to 20 to 1 to 200 and the reactant gas stream is passed through a bed of activated charcoal granules to produce a product stream containing olefins having the same number of carbon atoms as the feedstock.

The nature of the present invention can be further clarified by reference to a plurality of examples.

EXAMPLE I

A laboratory apparatus for oxidative dehydrogenation of butane consisted of a vertically positioned Pyrex tube having a diameter of 1 inch and a height of about 25 inches, divided into five oxidative dehydrogenation zones of about 5 inches each. Air injection inlets were positioned 5 inches apart at various levels of the reactor and the mixing zone immediately following each inlet was filled with quartz granules. Interposed between the quartz-filled mixing zones were oxidative dehydrogenation zones, each filled with granules of high surface area carbon, the granules being from about 8 to about 15 mesh size. Thus the gas flowed alternately through beds of quartz granules and beds of carbon granules, the beds being of approximately equal depth. Separate tests established that the quartz granules provided an inert surface for the oxidative dehydrogenation reaction and that the carbon granules provided a surface modifying the oxidative dehydrogenation reaction to improve both the extent of conversion and selectivity.

The reactor was heated to the desired temperature by an externally wrapped electrical heating element, and the temperature of each portion of each combustion zone was measured intermittently by appropriately positioned thermocouples. A mixture of steam and hydrocarbon having the desired ratio of hydrocarbon to steam was introduced into the preheated reactor and mixed with the controlled amount of air in the first mixing zone, and the thus prepared gaseous reactant stream flowed through the first oxidative dehydrogenative zone. The reactant stream flowed successively through four subsequent combinations of a zone for mixing with additional air and a zone for oxidative dehydrogenation of the feedstock. The term "repass number" designates the total number of dehydrogenation zones to which the reactant stream was subjected, so that a repass number of 25 indicates that the product from one pass was employed as feed for a repass through such string of five zones and such repassing was repeated five times. When the charge subjected to oxidative dehydrogenation was the product obtained in a previous oxidative dehydrogenation operation, the 5 zone reactor permitted evaluation of a method employing a greater number of oxidative dehydrogenation zones.

Butane was oxidatively dehydrogenated in the presence of steam in said apparatus in a series of nine runs summarized in Table 1. Runs A–D represent recycling to a 20 repass number and runs E–J represent recycling at a lower space rate to a 25 repass number. The space velocity of the hydrocarbon component of the gas mixture at the initial inlet was a measurable quantity and was reported. The total gas velocity at various points in the apparatus was affected by the formation of combustion products and by the introduction of air. The hydrocarbon initial gas velocity was controlled so that it was 2900 for runs E–J and for runs A–D it was 4500 volumes of gas per volume of carbon granules in each dehydrogenation zone per hour. At a lower space velocity, the maximum butene in product was higher but the ratio of butene to carbon dioxide was significantly lower than at a higher space velocity. In all of runs A–J, the ratio of hydrocarbon to steam was maintained at about 1.16:1. In each of said runs A–J, the oxygen concentration of the mixture leaving the mixing zone adjacent the air inlet was about 2% based upon the molar concentration of the initial total hydrocarbon feed, providing a molar ratio of the oxygen to the hydrocarbon of about 1 mol of oxygen per 45 mols of hydrocarbon. The reactant stream contained about 3.74 mols of nitrogen for each mol of oxygen previously introduced. The runs were conducted at a temperature within the range from 900–950° F. In each case the hydrocarbon recovery was satisfactory such as 97.7% or 100%.

Data relating to runs A–J for the preparation of butene by the oxidative dehydrogenation of normal butane are set forth in Table 1.

*Table 1*

| Run | Repass Number | Mol Ratio, $C_4H_{10}:C_4H_8$ | GVVH | Wt. Percent HC Rcvd. | Percent $C_4H_8$ in Prod. | Percent $C_4H_{10}$ in Prod. | Percent $C_4H_8$ Yield | Percent $C_4H_{10}$ Conv. | Percent $C_4H_8$ Selec. | $CO_2$ Percent of Feed | Cum. $CO_2$ Percent of Feed | Cum. Ratio $C_4H_8:CO_2$ |
|---|---|---|---|---|---|---|---|---|---|---|---|---|
| A | 5  | 100:0        | 4,500 | 97.7 | 8.56  | 86.6 | 8.56 | 13.4 | 63.9 | 2.9  | 2.9  | 2.9  |
| B | 10 | 91.5:7.8     | 4,500 | 100  | 13.7  | 83.7 | 6.5  | 7.95 | 82   | 2.62 | 5.5  | 2.5  |
| C | 15 | 84.75:13.14  | 4,500 | 100  | 17.3  | 80.5 | 4.16 | 5.25 | 79.5 | 2.5  | 8.0  | 2.2  |
| D | 20 | 80:19.2      | 4,500 | 100  | 19.3  | 78   | 0.3  | 1.85 | 16.3 | 2.12 | 10.1 | 1.9  |
| E | 5  | 100:0        | 2,900 | 99.9 | 9.35  | 87.1 | 9.28 | 13.5 | 68.6 | 4.1  | 4.1  | 2.3  |
| F | 10 | 80.1:8.93    | 2,900 | 97.1 | 16.4  | 81.4 | 6.83 | 11.8 | 58   | 3.6  | 7.7  | 2.1  |
| G | 15 | 83:16        | 2,900 | 95.8 | 19.5  | 76.3 | 3.46 | 11.6 | 29.8 | 6.0  | 13.7 | 1.4  |
| H | 20 | 81:17.14     | 2,900 | 98.5 | 21.2  | 75.4 | 2.83 | 11.3 | 27.6 | 4.8  | 18.5 | 1.1  |
| J | 25 | 76.3:22.1    | 2,900 | 101  | 22.1  | 74.4 | 0    | 4.9  | 0    | 3.9  | 22.4 | 0.99 |

EXAMPLE II

By a series of tests it was established that: activated carbon was more effective than other tested contact materials in the oxidative dehydrogenation of butane; activated carbon in the dehydrogenation zone provided results superior to those obtained in an open dehydrogenation zone; the presence of steam promoted more favorable butene to carbon dioxide ratios when the hydrocarbon to steam ratio was within a ratio of about 2 to 1 to about 1 to 10, the oxidative dehydrogenation was effective in preparing propylene from propane and ethylene from ethane provided the minimum steam concentration of 33% of the hydrocarbon, oxygen concentration within the range from about 0.5 to 5% of the total charged gas stream, and related requirements were maintained; and the olefin could be separated from the effluent gas stream from the bed of granules of high surface area (i.e., activated) carbon. Tests demonstrated that the oxygen cumulatively introduced should be from 10% to 80% of the volume of hydrocarbon feed.

Obviously many modifications and variations of the invention as hereinbefore set forth may be made without departing from the spirit and scope thereof, and therefore only such limitations should be imposed as are indicated in the appended claims.

What is claimed is:

1. The method of preparing olefinic acyclic hydrocarbons containing from 3 to 5 carbon atoms per molecule, which method consists essentially of: preparing a reactant stream consisting essentially of steam, a feedstock containing a saturated hydrocarbon having from 3 to 5 carbon atoms per molecule, inert gas, and oxygen in a concentration providing a volume ratio of oxygen to the total gas greater than 1 to 200 but less than 1 to 20, the gas volume ratio of hydrocarbon to steam being greater than 1 to 10 but less than 2 to 1 directing said reactant gas stream through a bed of granules of activated carbon; introducing additional oxygen and inert gas at a plurality of points along the path of the reactant gas stream through the activated carbon, so that the total oxygen amounts to from 10% to 80% of the volume of the hydrocarbon feed; withdrawing the reactant stream; and separating from the effluent from the bed of activated carbon and olefin stream having the same number of carbon atoms per molecule as the feedstock.

2. The method of preparing normal butenes which method consists essentially of: preparing a reactant stream consisting essentially of normal butane feed, a volume of steam slightly larger than the volume of butane, and air providing a volume of oxygen constituting at least 0.5% of the volume of the butane; directing said reactant gas stream through a bed of granules of activated carbon at a temperature greater than 900° F. but less than 950° F. so that from about 2900 to about 4500 volumes of butane per volume of carbon per hour are directed through the carbon bed; preparing a mixture of the effluent from the carbon bed with air providing oxygen in an amount of at least 0.5% of the weight of butane feed; subjecting the thus prepared mixture to a bed of granules of activated carbon at 900–950° F. so that from about 2900 to about 4500 volumes of butane feed per volume of carbon per hour are directed through the carbon bed; repeating for a plurality of times such mixing of effluent with additional air and such subjecting of the oxygen containing mixture to a carbon bed at a temperature greater than 900° F. but less than 950° F., whereby more moles of butene than carbon dioxide are produced and whereby the total oxygen supplied is from 10% to 80% of the volume of the butane feed; withdrawing an effluent from the final subjecting to a carbon bed; and separating normal butenes from such effluent.

References Cited in the file of this patent

UNITED STATES PATENTS

| 1,808,168 | Hopkins | June 2, 1931 |
| 2,069,624 | Prutton et al. | Feb. 2, 1937 |